Patented Feb. 8, 1927.

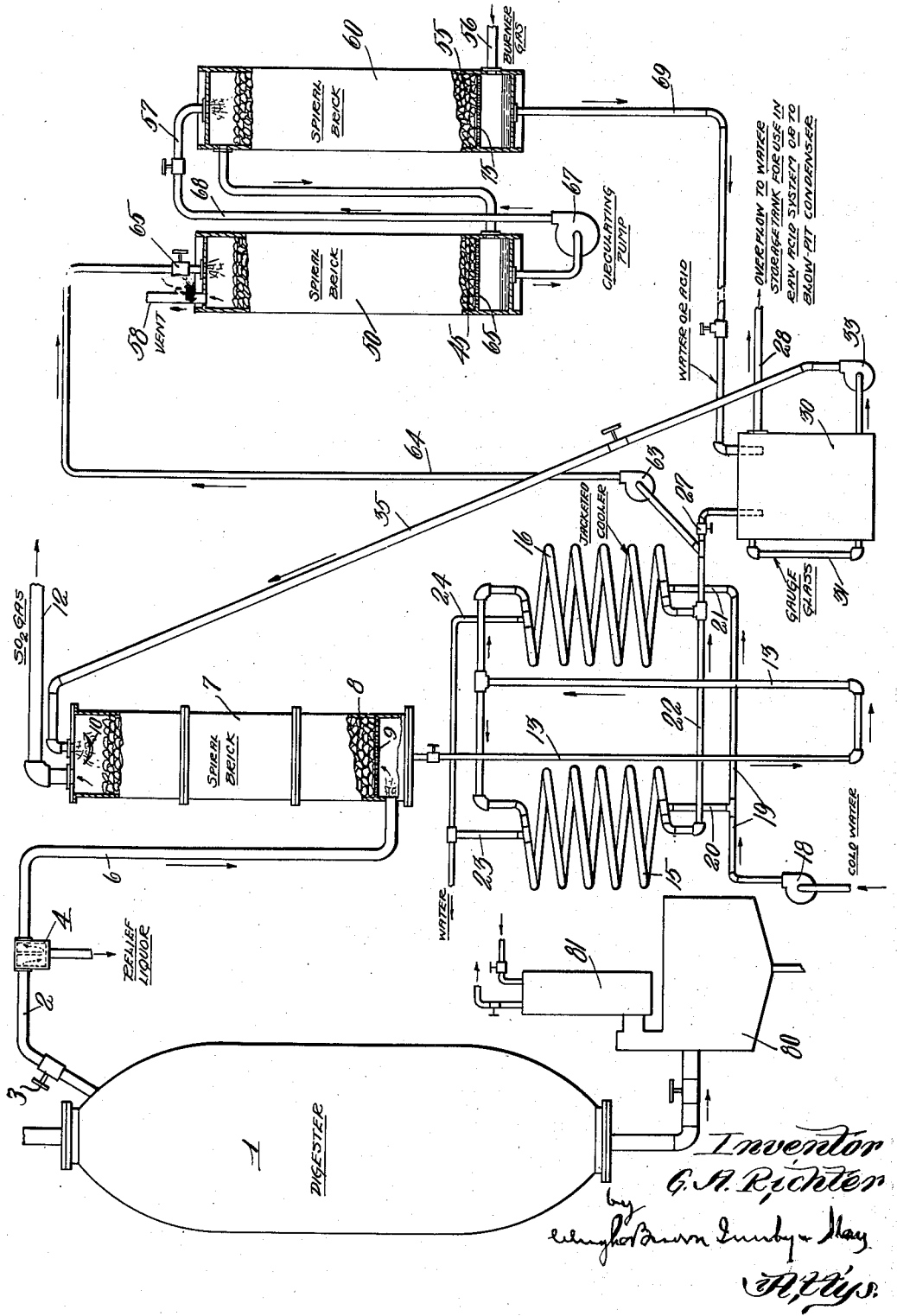

1,616,703

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

METHOD FOR COOLING AND UTILIZING THE HEAT CONTENT OF RELIEF GAS FROM SULPHITE DIGESTERS.

Application filed April 28, 1925. Serial No. 26,363.

This invention relates to the cooling of relief gas from sulphite digesters, and has for its primary object to cool such relief gas in an economical manner. A further object of this invention is to utilize the heat content of relief gas in making available a large volume of highly concentrated sulphur dioxide for the fortification or enrichment of raw bisulphite liquor to a high free $SO_2$ content, thereby producing an acid cooking liquor ready for use in the sulphite digesters.

In the preparation of an acid cooking liquor for the liberation of fiber from wood chips, a raw acid liquor is first produced, which has a relatively low free $SO_2$ content, as by passing sulphur burner gases in counter-current contact with water, through limestone-filled towers arranged in series. The raw acid liquor thus produced may subsequently be strengthened to a higher free $SO_2$ content by the addition thereto of a more concentrated sulphur dioxide, such as that recovered from blow pit gases, in which case what is known as an intermediate cooking liquor is formed. In order to prepare a finished acid cooking liquor,—that is, to bring the liquor to a point at which it is ready for use in sulphite digesters for the liberation of fiber and the production of sulphite pulp,—it is ordinarily desirable to strengthen such raw or intermediate acid liquors by the addition thereto of highly concentrated sulphur dioxide, such as relief gas.

The relief gas as blown from the digester is, however, hot and moist, and, since the final strength of the finished cooking liquor depends upon the concentration of the sulphur dioxide added thereto, and the temperature thereof, provision must be made to cool the hot relief gas and free it from any liquor and steam. The ordinary practice in sulphite mills is to cool the relief gas indirectly: that is, the relief gas is passed through a lead-lined water-cooled surface condenser whereby the steam associated therewith is condensed out and there results a cooled more concentrated sulphur dioxide gas which is in condition for fortifying raw or intermediate acid liquor. Such practice, however, calls for the use of relatively large and expensive surface condensers, and entails the loss of the heat content of the sulphur dioxide and the steam of the relief gas.

According to the present invention, however, the relief gas is cooled by passing it through a tower filled with inert surface or interstitial material, such as spiral brick or field rock, in contact with and in counter-current flow to cold water. The cold water cools the relief gas and condenses out substantially all the steam therein, so that a cool gas containing a very high per cent of sulphur dioxide emerges from the top portion of the tower and a hot effluent which contains a comparatively small amount of dissolved sulphur dioxide passes out from the bottom portion of the tower. The dissolved sulphur dioxide in the effluent water from the tower is not lost. Provision is made for reemploying the effluent, by first cooling it in a relatively small surface cooler and then re-circulating it through the relief gas cooling tower.

The system as outlined thus far possesses certain advantages over the ordinary method of cooling relief gas, which will subsequently be pointed out. There are, however, certain other advantages which may be realized according to the present invention by the utilization of the heat content of the relief gas. As has been stated, its heat content may be utilized in making available larger quantities of concentrated sulphur dioxide for the fortification of raw acid liquor. This is accomplished by passing the cooled effluent in contact with and in counter-current flow to sulphur burner gas, whereby a sulphurous acid liquor is produced which is saturated to a maximum sulphur dioxide content obtainable with burner gas at ordinary temperatures. The effluent, now enriched with sulphur dioxide, is re-employed in cooling other relief gas, and as it is heated up in the cooling of hot relief gas, the dissolved sulphur dioxide therein is liberated, so that the sulphur dioxide gas emerging from the top of the cooling tower not only consists of cooled relief gas, but also the liberated sulphur dioxide gas which was dissolved in the cooled effluent.

On the accompanying drawing, I have represented conventionally and diagrammatically the various instrumentalities which are employed in the process, but have not attempted to indicate their relative dimensions or locations, or to show the details of their construction.

Referring to the drawings, 1 represents the usual digester, at the lower portion of which I have shown the digester blow pit 80 and a direct condenser 81 thereabove, which serves as a part of a recovery system by which sulphur dioxide is recovered from blow pit vapors and gases. At the top portion of the digester 1 and communicating therewith I have indicated a relief pipe 2, valved as at 3. The pipe 2 is screened at its inlet (not shown) to prevent the entrance of pulp therein, and is connected to a liquor separator 4, the function of which is to trap any entrained liquor contained in the relief gas. The sulphur dioxide contained in the separated liquor may be recovered, as by passing the liquor into the blow pit condenser 81. From the separator 4 the relief gas passes through a conduit 6, into the bottom portion of a cooling tower 7. This tower is made of the usual acid-resistant materials, such as wood or concrete, and is filled with inert interstitial or surface material 8, which is supported by a perforated partition 9. The relief gas passes upwardly through the interstitial material and contacts with the cool effluent which is introduced and suitably distributed, as by a distributor 10, at the top portion of the tower. The relief gas is cooled by the downwardly trickling cold liquor, the steam contained therein being condensed and a cooled gas consisting substantially entirely of sulphur dioxide near the temperature of the entering cooling liquor is drawn off from the top of the tower through a conduit 12 for use in the fortification of raw or intermediate acid liquor to its cooking strength. The cooling liquor is heated during its downward passage by the hot relief gas, and falls to the bottom of the tower, from which it is conducted to a liquor cooling system by the valved U shaped pipe line 13. The U shaped delivery pipe to the cooler acts as a gas seal, and prevents the entrance of relief gas into the cooling system.

The liquor cooling system as shown consists of two coil coolers 15 and 16, of the double pipe type, arranged in parallel. The hot effluent from the tower is passed through the inner pipes of the coolers and is cooled by passing cooling water in counter-current flow thereto through the outer pipe, around the inner concentric pipe. The cooling water, which may be supplied from a river at seasonable temperature, is pumped by the pump 18 through a pipe 19, and divides into two branches 20 and 21, which enter the coils 15 and 16 respectively at the points of exit of the cooled effluent from the coolers,—the heated cooling water leaving the coolers through the exit water pipe lines 23 and 24 at the points of entrance of the hot effluent into the coolers and entering a discharge pipe line 24. The cooled effluent from both coils is passed through a pipe line 22, valved as at 27, and discharged into a relatively small wooden head box 30, provided with a gage glass 31. It is now in a condition to be re-employed for cooling other relief gas. There may be an excess amount of liquor due to the condensation of steam contained in the relief gas which is carried along with the effluent cooling liquor, and this excess tending to rise above a predetermined level in the head box 30 is drawn off through an overflow pipe 28 and may be mixed with the water used in the preparation of a raw acid liquor, or it may be passed into the blow pit condenser tower 81 and the $SO_2$ content recovered. The remainder of the cooled effluent may now be re-employed in cooling other relief gas, and is pumped by a pump 33 through the pipe line 35 and distributed at the top portion of the tower 7, as previously described.

As has already been mentioned, where it is desirable to utilize the heat content of the relief gas in making available a larger quantity of concentrated sulphur dioxide for the fortification of raw or intermediate acid cooking liquor, the cooled effluent is enriched with $SO_2$, as by saturating it to the maximum $SO_2$ concentration obtainable with sulphur burner gas, and then passing the enriched effluent back into the relief gas cooling tower 7.

The system for producing the enriched effluent comprises two absorption towers 50 and 60. These towers (preferably of equal size and constructed of wood or other acid-resistant material) are filled with inert interstitial or surface material, such as spiral brick or field rock, as indicated at 45 and 55, supported by the perforated partitions 65 and 75. Cooled and more or less purified sulphur burner gases, so-called, resulting from the combustion of sulphur or sulphur-bearing material, are introduced into the lower end of one of the towers, as 60, under sufficient pressure to produce a flow of gas, by a fan blower (not shown) through a pipe 56 leading from the cooling apparatus. These gases are caused to pass through the absorption towers 50 and 60, in series, by a valved pipe 57 leading from the upper portion of tower 60 to the lower portion of tower 50. The tail gases from tower 11 are wasted through an outlet pipe 58, at the top portion of tower 50.

In a system where provision is made for enriching the effluent, the valve 27 is closed and the cooled effluent is introduced into the tower 50 by the pump 63 through the pipe or conduit 64, valved at 65, and is caused to flow in countercurrent contact to the flow of the gases through the towers in series, being pumped by a pump 67 from the tower 50 to the tower 60 through a valved intermediate connecting pipe 68. The cooled effluent, saturated to its maximum $SO_2$ content, falling to the bottom of the tower 60, is conducted through the valved pipe line 69 to the head box 30, from which it may be pumped to the top of the tower 7, in cooling other relief gas.

In order to give a more complete understanding of the process and apparatus thus far described, I will supplement the foregoing description by certain established facts which are made use of, some of the advantages incident to this invention, and various other features and data in connection therewith.

In the first place, disregarding for the time being the utilization of the heat contained in the relief gas, this invention obviates the use of a large surface condenser, which ordinarily is employed in the cooling of relief gas, and substitutes therefor a tower filled with a very cheap surface material, and a relatively small and inexpensive surface condenser; that is, instead of cooling relief gas by its indirect contact with water through lead-lined pipe, I have provided for the cooling of the relief gas by direct contact with water. By the method described, the gas is easily cooled to a temperature within 10° F. or 15° F., of that of the cooling liquor which enters the top of the tower. The effluent cooling liquor is heated to 160° F. to 210° F., and at this elevated temperature the solubility of sulphur dioxide is so low that it contains only about 0.1% to 0.3% $SO_2$. This small $SO_2$ content in the effluent water is not lost, for the effluent is cooled in a surface condenser and is re-employed in cooling the relief gas; but because the heat conduction takes place from a liquid through a solid (e. g., lead surface) to a liquid rather than between a gas through a solid to a liquid (where a surface condenser is employed for cooling the relief gas) a considerably smaller cooler is required. In other words, a cheaper and more efficient gas-cooling apparatus, entailing no loss of $SO_2$, has been substituted for a relatively large and expensive surface condenser.

When the cooled effluent is fortified with burner gas in an absorption system, a sulphurous acid solution containing 2.0% to 2.5% sulphur dioxide is delivered for cooling relief gas. The fortified cooled effluent loses substantially its entire $SO_2$ content during its downward passage through the relief gas cooling tower, so that when it emerges hot from the tower it will contain from 0.1% to 0.3% dissolved $SO_2$, as previously, and the effluent may now again be subjected to cooling and fortification, and the process repeated. When this mode of operation is carried out, the volume of relief gas leaving the top of the cooling tower will have been increased by the sulphur dioxide liberated from the fortified and cooled effluent introduced at the top of the relief gas cooling tower. The advantage is readily obvious, because a 14% to 15% burner gas has been converted into a 90% to 100% sulphur dioxide gas, without the expenditure of extraneous heat or power. The fortification of the cooled effluent is especially desirable at times when there is not enough relief gas available from the digesters to maintain a high free $SO_2$ content in a finished acid cooking liquor. By fortifying the effluent as described, the heat contained in the relief gas allows an increase of 0.2 to 0.4 free $SO_2$ in the finished acid cooking liquor, than when the effluent liquor is not fortified with burner gas. It is of course understood that the relief gas cooling system may, or may not, be operated with the fortification of the cooled effluent. If a cooking acid liquor of sufficient strength may be produced without the utilization of the heat content of the relief gas, the absorption system would be by-passed and only a cooled effluent would be re-circulated for the cooling of relief gas. If it were desired to step up the free $SO_2$ content in the cooking liquor, the cooled effluent would be passed into the absorption system.

What I claim is:

1. A process of cooling hot relief gas containing sulphur dioxide and steam obtained during the relieving operation of sulphite digesters, which comprises passing said gas in contact with and in counter-current flow to relatively cold water, whereby said gas is cooled and the steam is condensed therefrom, and said water is heated so that it contains comparatively little sulphur dioxide; cooling said water, passing said cooled water in contact with and in counter-current flow to sulphur burner gases, whereby its sulphur dioxide content is increased; and re-employing said acidulated water in cooling other relief gas, whereby the volume of said cooled relief gas is increased by the volume of sulphur dioxide liberated from said acidulated water.

2. A process of producing a cool gas rich in free sulphur dioxide which comprises passing cool water acidulated with sulphur dioxide from an independent source in contact with and in counter-current flow to hot relief gas from sulphite digesters, thereby liberating sulphur dioxide from said water and condensing the steam and cooling the sulphur dioxide of said relief gas.

3. A process which comprises passing hot relief gas from sulphite digesters in contact with and in counter-current flow to relatively cold water acidified with sulphur dioxide from a separate source, whereby said gas is cooled and a large portion of water vapor is condensed therefrom and said water heated to liberate sulphur dioxide therefrom to be recovered with the cooled relief sulphur dioxide, cooling said water re-acidulating said water and re-employing said cooled and acidulated water in cooling other relief gas.

4. A process which comprises passing water acidulated with sulphur dioxide from sulphur burner gas in contact with and in counter-current flow to hot relief gas from sulphite digesters, whereby the volume of cooled relief gas is increased by the volume of sulphur dioxide liberated from said acidulated water.

5. A process which comprises passing hot relief gas from sulphite digesters in contact with and in counter-current flow to relatively cold water acidulated with sulphur dioxide, whereby said gas is cooled and said water is heated, cooling said water, acidulating said cooled water with sulphur dioxide to increase its $SO_2$ content, and re-employing said cooled and acidulated water in cooling other relief gas.

In testimony whereof I have affixed my signature.

GEORGE A. RICHTER.